Patented Apr. 5, 1932

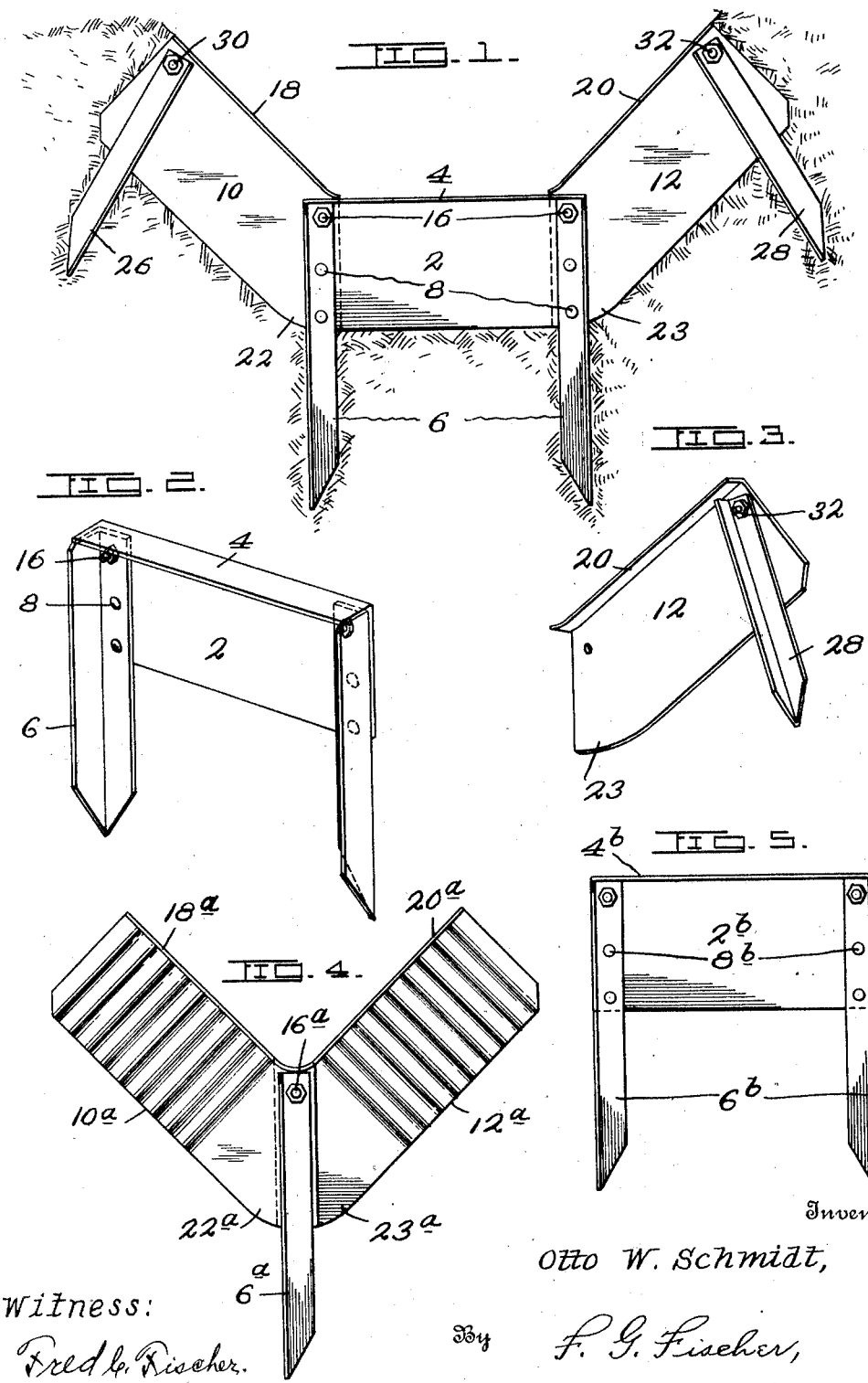

1,852,268

UNITED STATES PATENT OFFICE

OTTO W. SCHMIDT, OF KANSAS CITY, MISSOURI

DITCH CONSERVER

Application filed March 27, 1931. Serial No. 525,676.

My invention in general relates to means for preventing soil erosion and more particularly to means for preventing drainage ditches at opposite sides of roadways from washing out and thereby endangering said roadways. The usual practice for accomplishing the above result is to place boards or stones across the bottom of the ditch, but such method affords only temporary relief as the rain soon washes the soil from beneath such barriers so that they sink below the normal level of the ditch and have to be replaced or added too quite frequently, necessitating considerable expense for upkeep.

The present invention is designed to provide an economical and permanent check against washouts and includes a plurality of members which may be countersunk to the normal level of the bottom of the ditch for the purpose of preventing the soil from being washed from beneath said members. In one form of the invention a plurality of members are operably connected together so that they may be adjusted to fit the bottom and the sides of the ditch; and said members are provided with anchoring means whereby they may be reliably secured in place.

In order that the invention may be fully understood reference will now be had to the accompanying drawings, in which:—

Fig. 1 is a cross section of a ditch equipped with one form of the invention.

Fig. 2 is a detail perspective of the central member shown by Fig. 1.

Fig. 3 is a detail of one of the wings shown by Fig. 1.

Figs. 4 and 5 show modified forms of the device.

In constructing the form shown by Fig. 1 I provide a centrally-disposed member 2 of rectangular configuration and reinforced along its upper portion with a marginal flange 4. The member 2 is also reinforced at its ends with anchors consisting preferably of vertically disposed stakes 6 which are rigidly secured in place in any approved manner, as for instance, by means of bolts or rivets 8.

End members or wings 10 and 12 are adjustably secured to the upper portion of the central member 2 and the stakes 6 by suitable means such as pivots 16, and said end members or wings 10 and 12 are reinforced at their upper portions with marginal flanges 18 and 20, respectively. The wings 10 and 12 are substantially of rectangular form excepting that their ends 22 and 23, which overlap the respective ends of the central member 2, are cut at an oblique angle so that gaps will not be left between the ends of the members when the wings 10 and 12 are adjusted to the sloping sides of the ditch as shown by Fig. 1.

The free ends of the wings 10 and 12 are provided with stakes 26 and 28 which are connected at their upper ends to the upper outer corners of said wings 10 and 12 by pivots 30 and 32, respectively. By thus operably connecting the stakes 26 and 28 to the respective wings 10 and 12, said stakes can be readily driven into the ground regardless of the slope to which the wings may be adjusted.

When being installed in new ditches the devices are sunk to the level of the bottom and sides of said ditches to prevent said bottom and sides from being washed out by rain, but when installed in old ditches which have been washed out the devices are set with their upper margins projecting above the normal level of the bottoms and sides of said ditches, so that they will act as barriers to soil washed into the ditches until the bottoms and sides of the latter have been restored to normal level.

In the simplified form disclosed by Fig. 4, the central member 2 and the two endmost stakes 26 and 28 are dispensed with and the two wings 10a and 12a are pivotally connected to each other and a central stake 6a. The wings 10a and 12a are also reinforced with corrugations, but in other respects are similar to the wings 10 and 12 as is evidenced by corresponding reference numerals with exponents a.

Fig. 5 shows another simplified form of the device in which the wings 10 and 12 and the stakes 26 and 28 are dispensed with, only the central member 2b and the stakes 6b being retained. The member 2b is reinforced at its upper margin with a flange 4b, and the stakes 6b are rigidly connected to the ends of the member 2b by elements 8b.

The forms shown by Figs. 4 and 5 are intended more particularly for use in small ditches. They may also be used to advantage for preventing the formation of gullies on roads and farm lands and in otherwise preventing soil erosion.

From the foregoing description it is apparent that I have provided devices which are well adapted for the purpose intended, and while I have shown three forms of the device I reserve all rights to such other forms and modifications thereof as properly fall within the spirit and scope of the invention as claimed.

Having thus described my invention what I claim is: —

1. A device of the character described consisting of a centrally disposed member, wings pivotally connected to opposite sides of said member so that they may be adjusted to different angles, stakes rigidly secured to the centrally disposed member, and stakes pivotally connected to the wings.

2. A device of the character described comprising a central body portion, stakes secured to said body portion and extending from the upper portion thereof to a suitable distance below the lower edge of said body portion, wings arranged at opposite ends of said body portion and on substantially the same level thereof, and means pivotally connecting the adjacent upper corners of the body portion and said wings so that the latter may be swung upwardly at various angles to said body portion.

3. A device of the character described comprising a central body portion, stakes secured to said body portion and extending from the upper portion thereof to a suitable distance below the lower edge of said body portion, wings arranged at opposite ends of said body portion and on substantially the same level thereof, means pivotally connecting the adjacent upper corners of the body portion and said wings so that the latter may be swung upwardly at various angles to said body portion, and stakes connected to said wings and extending below the latter.

4. A device of the character described comprising a central body portion, stakes secured to said body portion and extending from the upper portion thereof to a suitable distance below the lower edge of said body portion, wings arranged at opposite ends of said body portion and on substantially the same level thereof, means pivotally connecting the adjacent upper corners of the body portion and said wings so that the latter may be swung upwardly at various angles to said body portion, stakes for said wings, and means pivotally connecting said stakes to the upper outer corners of said wings.

5. A device of the character described comprising a central body portion, stakes secured to said body portion and extending from the upper portion thereof to a suitable distance below the lower edge of said body portion, wings arranged at opposite ends of said body portion and pivotally connected to the upper adjacent corners thereof, the inner ends of said wings being arranged at oblique angles and overlapping the adjacent ends of the body portion, and means pivotally connecting the adjacent upper corners of the body portion and said wings so that the latter may be swung upwardly at various angles to said body portion.

In testimony whereof I affix my signature.

OTTO W. SCHMIDT.